US009348895B2

(12) United States Patent
Bao et al.

(10) Patent No.: US 9,348,895 B2
(45) Date of Patent: May 24, 2016

(54) AUTOMATIC SUGGESTION FOR QUERY-REWRITE RULES

(71) Applicant: International Business Machines Corporation, Armonk, NY (US)

(72) Inventors: Zhuowei Bao, Philadelphia, PA (US); Benny Kimelfeld, Cupertino, CA (US); Yunyao Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 13/875,174

(22) Filed: May 1, 2013

(65) Prior Publication Data

US 2014/0330804 A1    Nov. 6, 2014

(51) Int. Cl.
    G06F 17/30    (2006.01)
(52) U.S. Cl.
    CPC ................. *G06F 17/30672* (2013.01)
(58) Field of Classification Search
    None
    See application file for complete search history.

(56) References Cited

U.S. PATENT DOCUMENTS

| | | | |
|---|---|---|---|
| 5,544,355 A | 8/1996 | Chaudhuri et al. | |
| 6,363,377 B1 | 3/2002 | Kravets et al. | |
| 6,442,537 B1 | 8/2002 | Karch | |
| 7,702,671 B2* | 4/2010 | Jacobs | G06F 17/30867 707/705 |
| 8,041,710 B2* | 10/2011 | He | G06F 17/30867 707/722 |
| 8,239,400 B2 | 8/2012 | Dettinger et al. | |
| 2005/0065774 A1* | 3/2005 | Doganata | G06F 17/30613 704/7 |
| 2008/0215564 A1 | 9/2008 | Bratseth | |
| 2008/0270356 A1* | 10/2008 | Anderson | G06F 17/30864 |
| 2010/0211588 A1* | 8/2010 | Jiang | G06F 17/30637 707/768 |

FOREIGN PATENT DOCUMENTS

WO    2011162645 A1    12/2011

OTHER PUBLICATIONS

Kerdprasop, K. et al., "Knowledge Acquisition for View-Based Query Processing", Proceedings of the IASTED International Conference on Intelligent Systems and Control, Nov. 2001, pp. 214-219, ACTA Press, Canada.

Zeng, Q.T. et al., "Assisting Consumer Health Information Retrieval with Query Recommendations", Journal of the American Medical Informatics Association, Jan./Feb. 2006, vol. 13, No. 1, pp. 80-90, American Medical Informatics Association, USA.

Kabra, N. et al., "Efficient Mid-Query Re-Optimization of Sub-Optimal Query Execution Plans", Proceedings of the 1998 ACM SIGMOD International Conference on Management of Data (SIGMOD '98), Jun. 1998, pp. 106-117, ACM, USA.

(Continued)

*Primary Examiner* — Jay Morrison
(74) *Attorney, Agent, or Firm* — Sherman IP LLP; Kenneth L. Sherman; Joshua A. Schaul

(57) ABSTRACT

Embodiments of the invention relate to automatically suggesting query-rewrite rules. One embodiment includes providing a missing search result for a query. A collection of semantically coherent rewrite rules are generated based on the missing search result. Generating the missing search result includes: selecting candidates including subsequences of the query and subsequences of particular fields of a document, invoking a search engine using the candidates for providing search results, filtering out particular candidates that fail to achieve a desired search result, and classifying remaining candidates based on a learned classifier. Query rewrite rules for document searching are suggested based on the classified remaining candidates.

20 Claims, 14 Drawing Sheets

(56) References Cited

OTHER PUBLICATIONS

Zhu, Y. et al., "Dynamic Plan Migration for Continuous Queries Over Data Streams", Proceedings of the 2004 ACM SIGMOD International Conference on Management of Data (SIGMOD '04), Jun. 2004, pp. 431-442, ACM, USA.

Yao, J. et al., "Keyword Query Reformulation on Structured Data", Proceedings of the IEEE 28th International Conference on Data Engineering (ICDE '12), Apr. 2012, 12 pages, IEEE, USA.

Baeza-Yates, R. et al., "Query Recommendation Using Query Logs in Search Engines", Proceedings of the 2004 International Conference on Current Trends in Database Technology (EDBT '04), Mar. 2004, pp. 588-596, Springer-Verlag Berlin, Heidelberg, Germany.

Jones, R. et al., "Generating Query Substitutions", Proceedings of the 15th International Conference on World Wide Web (WWW '06), May 2006, pp. 387-396, ACM, USA.

Zhang, Z. et al., "Mining Search Engine Query Logs for Query Recommendation", Proceedings of the 15th International Conference on World Wide Web (WWW '06), May 2006, pp. 1039-1040, ACM, USA.

Ozertem, U. et al., "Suggestion Set Utility Maximization Using Session Logs", Proceedings of the 20th ACM International Conference on Information and Knowledge Management (CIKM '11), Oct. 2011, pp. 105-114, ACM, USA.

* cited by examiner

| s | t |
|---|---|
| seasonal flu | avian flu |
| seasonal flu | h5n1 |
| seasonal flu | flu employee |
| seasonal flu | and companyX h5n1 |
| seasonal | avian |
| seasonal | h5n1 |
| seasonal | flu |
| seasonal | you and companyX |
| ... | ... |
| change management | scip |
| change management | strategy & change internal practice |
| change management | welcome to strategy |
| change management | welcome strategy |
| change management | strategy change & internal |
| change management | to strategy change internal practice |
| management | internal |
| management | index pages |
| management | internal practice scip |
| ... | ... |

---
Algorithm G-Greedy$((R, G), \delta, k)$

---
1: $S \leftarrow 0$
2: $\Delta \leftarrow 1$
3: while $\Delta > 0$ do
4:     $r \leftarrow \text{argmax}_{r \in R \setminus S} (\mu_k(G_{S \cup \{r\}}) - \mu_k(G_S))$
5:     $\Delta \leftarrow \mu_k(G_{S \cup \{r\}}) - \mu_k(G_S)$
6:     if $\Delta > 0$ then
7:        $S \leftarrow S \cup \{r\}$
8: return $S$

---
Algorithm L-Greedy$((R, G), \delta, k)$

---
1: $S \leftarrow 0$
2: $T \leftarrow \{(q, d) \in V_q \times V_d \mid d \in \delta(q)\}$
3: for all $(q, d) \in T$ do
4:     $r \leftarrow \text{argmax}_{r \in rel_k(q,d)} (\mu_k(G_{S \cup \{r\}}) - \mu_k(G_S))$
5:     if $\mu_k(G_{S \cup \{r\}}) > \mu_k(G_S)$ then
6:        $S \leftarrow S \cup \{r\}$
7: return $S$

AUTOMATIC SUGGESTION FOR QUERY-REWRITE RULES

BACKGROUND

Embodiments of the invention relate to query-rewrites and, in particular, automatic suggestion for query-rewrite rules.

Searching in enterprise domains is challenging for reasons such as the sparseness of link structure and anchor text, low economic incentive of content providers to promote easy search access, and a strong presence of dynamic, domain-specific terminology and jargon. Another practical difficulty is that enterprise search deployments are typically managed by administrators that are domain experts but may not be search experts.

BRIEF SUMMARY

Embodiments of the invention relate to automatically suggesting query-rewrite rules. One embodiment includes a method providing a missing search result for a query. A collection of semantically coherent rewrite rules are generated based on the missing search result. Generating the missing search result comprises: selecting candidates including subsequences of the query and subsequences of particular fields of a document, invoking a search engine using the candidates for providing search results, filtering out particular candidates that fail to achieve a desired search result, and classifying remaining candidates based on a learned classifier. Query rewrite rules for document searching are suggested based on the classified remaining candidates.

These and other features, aspects and advantages of the present invention will become understood with reference to the following description, appended claims and accompanying figures.

BRIEF DESCRIPTION OF THE SEVERAL VIEWS OF THE DRAWINGS

FIG. 4 illustrates an example table showing query terms and potential rewrite rules, in accordance with an embodiment of the invention;

FIG. 9 illustrates an example of a globally greedy process, in accordance with an embodiment of the invention;

FIG. 10 illustrates an example of a locally greedy process, in accordance with an embodiment of the invention;

DETAILED DESCRIPTION

Aspects of the present invention are described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
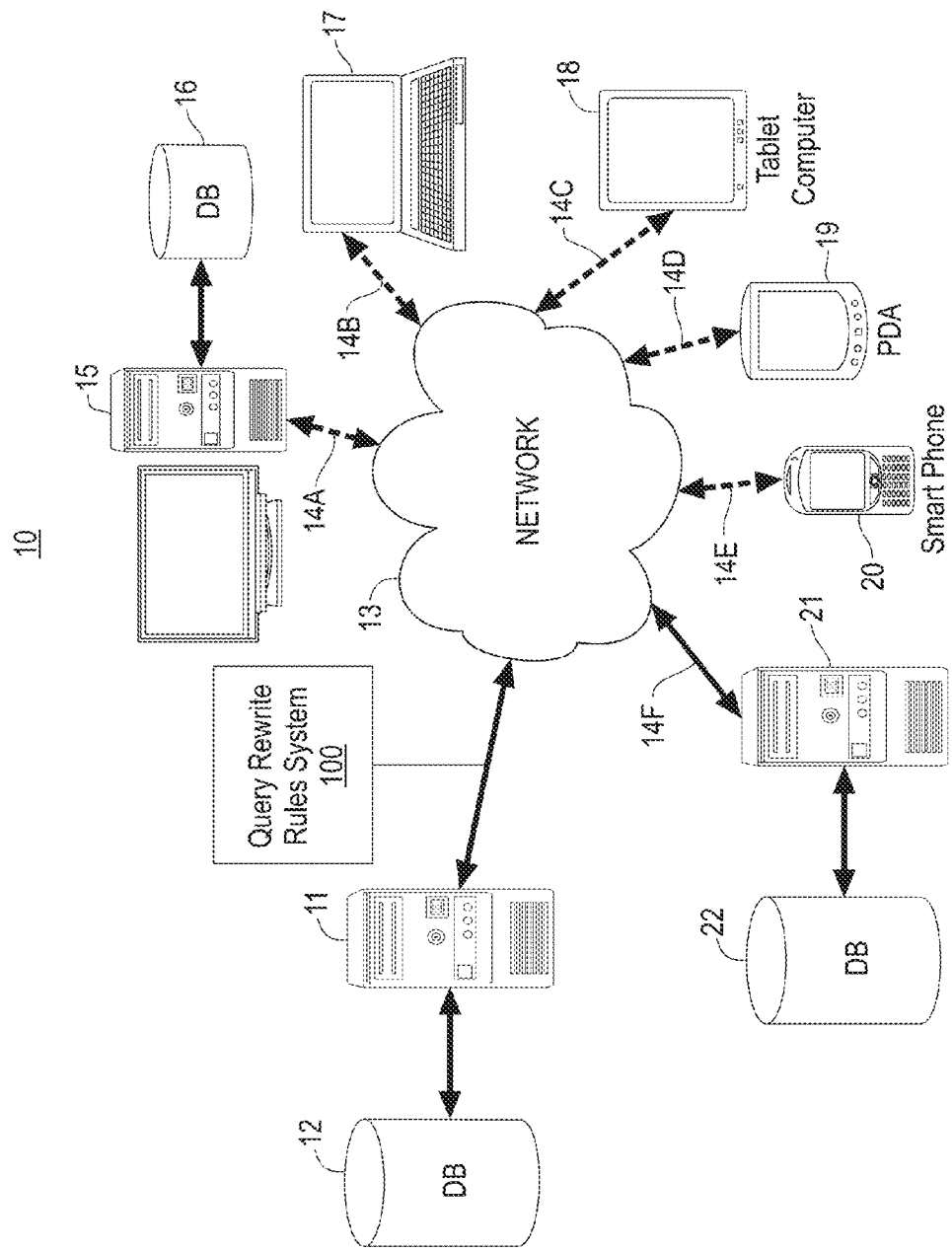
FIG. 1 is a block diagram illustrating an example of a network environment for automatic suggestion of query-rewrite rules, according to an embodiment of the present invention.

FIG. 1 illustrates an example of the basic components of an information technology system 10 utilizing system 100, according to an embodiment of the present invention. The information technology system 10 includes a server 11 and remote devices 15 and 17-20 that may utilize the system 100 of the present invention. In one embodiment, the server 11 implements the system 100 of the present invention.

Each of the remote devices 15 and 17-20 has applications and can have a local database 16. Server 11 contains applications, and is connected to a database 12 that can be accessed by remote device 15 and 17-20 via connections 14(A-F), respectively, over a network 13. The server 11 executes software for a computer network and controls access to itself and database 12. The remote device 15 and 17-20 may access the database 12 over the network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices, and the like. Included with each remote device 15 and 17-20 is an ability to request relevant material from a large collection of documents via search queries to the server 11. Thus, when a user at one of the remote devices 15 and 17-20 desires to access the system 100 and the database 12 at the server 11, the remote device 15 and 17-20 communicates over the network 13, to access the system 100, the server 11 and database 12.

Third party computer systems 21 and databases 22 can be accessed by the server 11 in order to provide access to additional collections of documents and/or search indexes. Data that is obtained from third party computer systems 21 and database 22 can be stored on server 11 and database 12 in order to provide later access to the user on remote devices 15 and 17-20. It is also contemplated that for certain types of data, the remote devices 15 and 17-20 can access the third party computer systems 21 and database 22 directly using the network 13.

Figure 2:
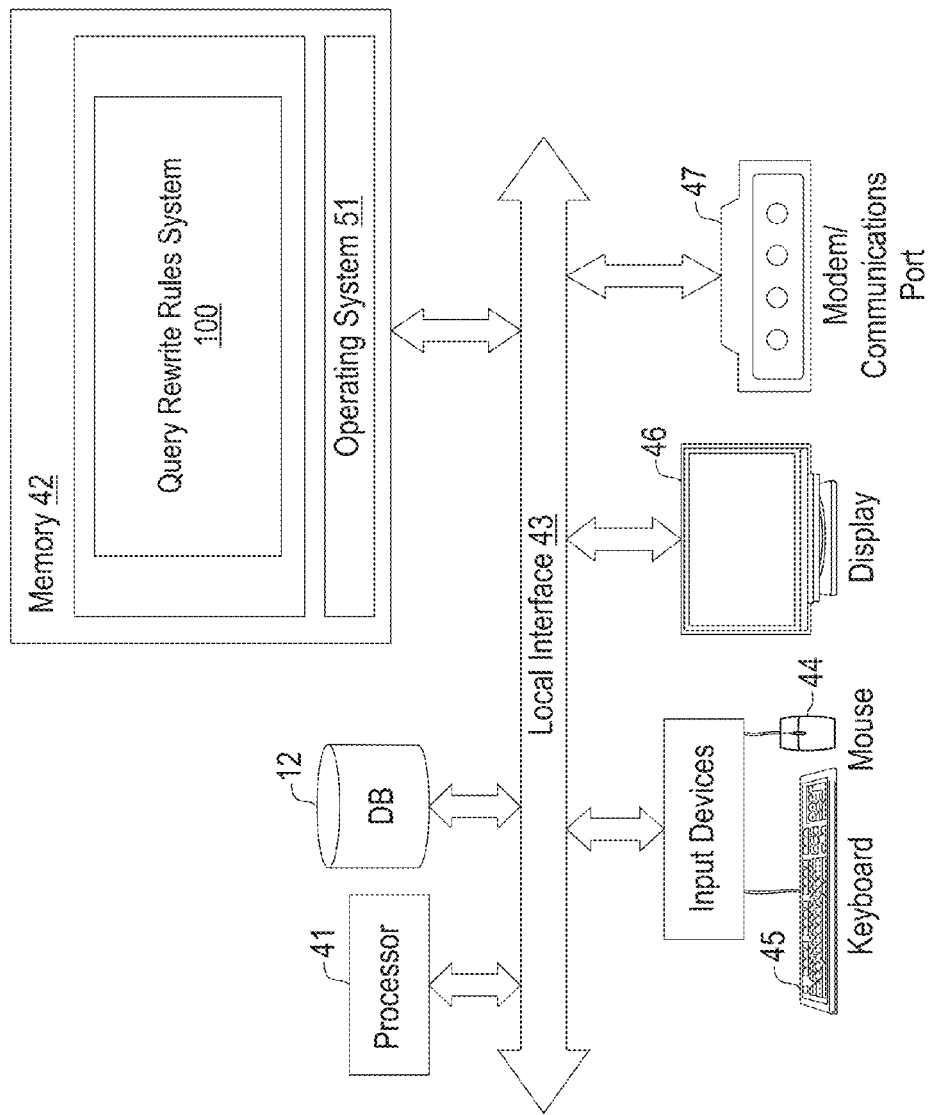
FIG. 2 is a block diagram illustrating an example of a server including a system utilizing automatic suggestion of query-rewrite rules, according to an embodiment of the present invention, as shown in FIG. 1.

The system 100 utilizes a process for automatically suggesting query-rewrite rules, according to an embodiment of the invention. Illustrated in FIG. 2 is a block diagram demonstrating an example of server 11, as shown in FIG. 1, utilizing the system 100 according to an embodiment of the present invention. The server 11 includes, but is not limited to, PCs, workstations, laptops, PDAs, palm devices, and the like. The processing components of the third party computer systems are similar to that of the description for the server 11 (FIG. 2).

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the search system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, starts the O/S 51, and supports the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

Query rewrite rules may be triggered by events, such as a complaint for a search (e.g., a search conducted on a network, such as an enterprise network, local area network (LAN), wide area network (WAN), etc.) that does not result in a returned document that may have been expected. As an example, such a complaint can be that a returned result of "http://instmgr.x.com/kmail" is missing from the top results for a search using terms, such as kmail download. Based on the complaint, an administrator can phrase a rewrite rule to accommodate the potential mismatch between the query and the document. Those rewrite rules are in the spirit of (actually, a generalization of) the "query template" rules. In particular, a rule is applicable to many queries (rather than to just one), and it may result in augmentation (rather than replacement) of the query by the newly generated query. For example, the administrator can phrase the rule download→instmgr that, in effect, will incorporate the results for kmail instmgr into those for kmail download when-ever the latter query is posed.

Manually formulating rewrite rules to handle complaints is an extremely tedious and a time consuming process. First, the administrator needs to inspect the specified document in order to come up with relevant rules. For each relevant rule, a rough estimation is made on its effect on other queries (and for that, query logs may be consulted). Next, the administrator tries out her rule of choice. If the desired effect (pushing up the desired match) is not realized, this process is repeated with alternative rules, sometimes until the conclusion that the problem lies in a ranking algorithm and/or the backend analytics.

Figure 3:
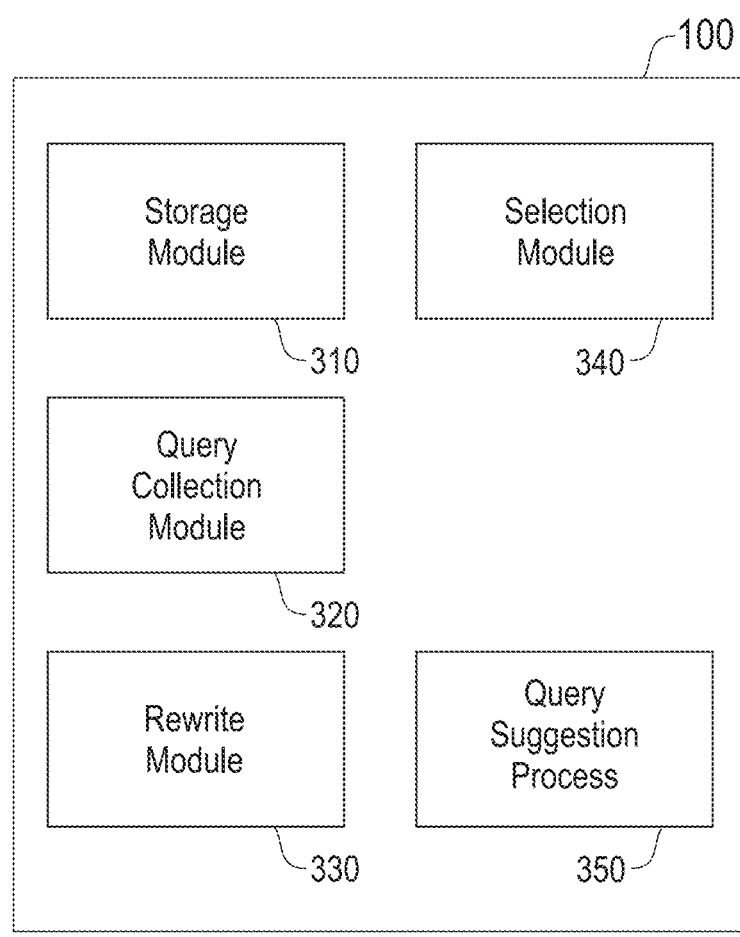
FIG. 3 illustrates a block diagram of an example system for automatically suggesting query rewrite rules, in accordance with an embodiment of the invention.

FIG. 3 shows an implementation of system 100 for automatically suggesting query-rewrite rules. In one embodiment, system 100 comprises a storage module 310, a query collection module 320, a rewrite module 330, a selection module 340 and a query suggestion process 350. In one embodiment, administrators of, for example, an enterprise search, are aided by system 100 using the query suggestion process 350 for automatically producing rewrite-rule suggestions that are already validated as problem solvers. In one embodiment, the storage module 310 stores documents that may be searched using search term queries, stores past search history, and search rules. In one embodiment the query collection module 320 gathers previous search terms for storage in the storage module 310. In one embodiment, the rewrite module 330 provides generation of query rewrite rules. In one embodiment, the selection module 340 provides for optimizing rewrite rules and selecting search terms for associating with documents stored by the storage module 310. In one embodiment, the query suggestion process 350 provides for automating suggestions for query-rewrite rules.

One embodiment may include generating candidates from the desired document (or from specific parts thereof), and filtering out those candidates that fail to achieve the desired effect. However, the number of possible rules obtained in this way can be overwhelmingly large. For example, using real data obtained from a chief information officer (CIO) office, one embodiment may reach about 100 query rewrite suggestions, and in some cases about 1000. More importantly, the vast majority of these rules may not make sense to an administrator as they are not rules of the kind that an administrator would devise or perceive as intuitive.

For illustration, FIG. 4 shows examples of the suggestions according to one implementation of an embodiment. The left side s 410 of table 400 shows query terms, while the right side t 420 shows rules for results. In the top part 415 of the table 400, terms relating to seasonal flu may have results 425, where the top two are reasonable but the others do not make reasonable sense. Note, however, that determining what "reasonable" or "sense making" means may require domain knowledge. In one example, search terms 416 are related to results 426 for strategy & change internal practice (SCIP), which may be used as a major consultant for organizational reconstruction. In one embodiment, the top rewrites for change management in the bottom part of table 400 make sense. But other rules 426 relating to the query terms 416 would not be considered reasonable.

In one embodiment, a rule that makes sense is referred to as natural. Formulating natural rules is necessary, as administrators should be confident in the semantic justification of each rule. Comprehensiveness, which is in the heart of the architecture philosophy, is violated if rules are inconsistent with human judgment. In one embodiment, automatic rule suggestion is a component of the query suggestion process 350 that classifies rules into natural rules and unnatural rules.

It is noted that a single rewrite rule can effect multiple queries, and hence, its inclusion can reduce the overall search quality. Further, a rule can eliminate the positive effect achieved by previous rules. For illustration, in the example 700 (FIG. 7), the rule kword→koffice in rules 710 rewrites the query kword download 720 in into koffice download 730, resulting in the document d2 740 being a top match. In one example, following a complaint on the query kmail download query terms, we introduce the rule r1 in rules 710, which is download→instmgr. However, r1 710 also effects our previous koffice download query terms by pushing down the desired match d2.

To address the above problem, a search administrator may maintain a representative benchmark of queries and desired matches (e.g., weighted by popularity) that includes those indicated in past complaints. To estimate the effect of a candidate rule, search quality may be evaluated (using a quality estimator of choice) by running a search engine against the benchmark. If a negative effect is detected, the administrator can avoid the rule, consider a new rule, or accept the loss in quality. But here, automation can contribute significantly in terms of both effort and quality. In one embodiment, the system 100 automatically suggests the selection of a subset of query rewrite rules to optimize quality (with respect to the underlying estimator). The administrator may then choose multiple rules (instead of just one) to address a specific complaint, and thereby enrich the search space for the system 100. In the example 700 (FIG. 7), for instance, if the system 100 had the rule kmail download→kmail instmgr at its disposal, it could suggest to use it instead of r1 710, and thus maintain the top results for both koffice download and kmail download.

Figure 5:
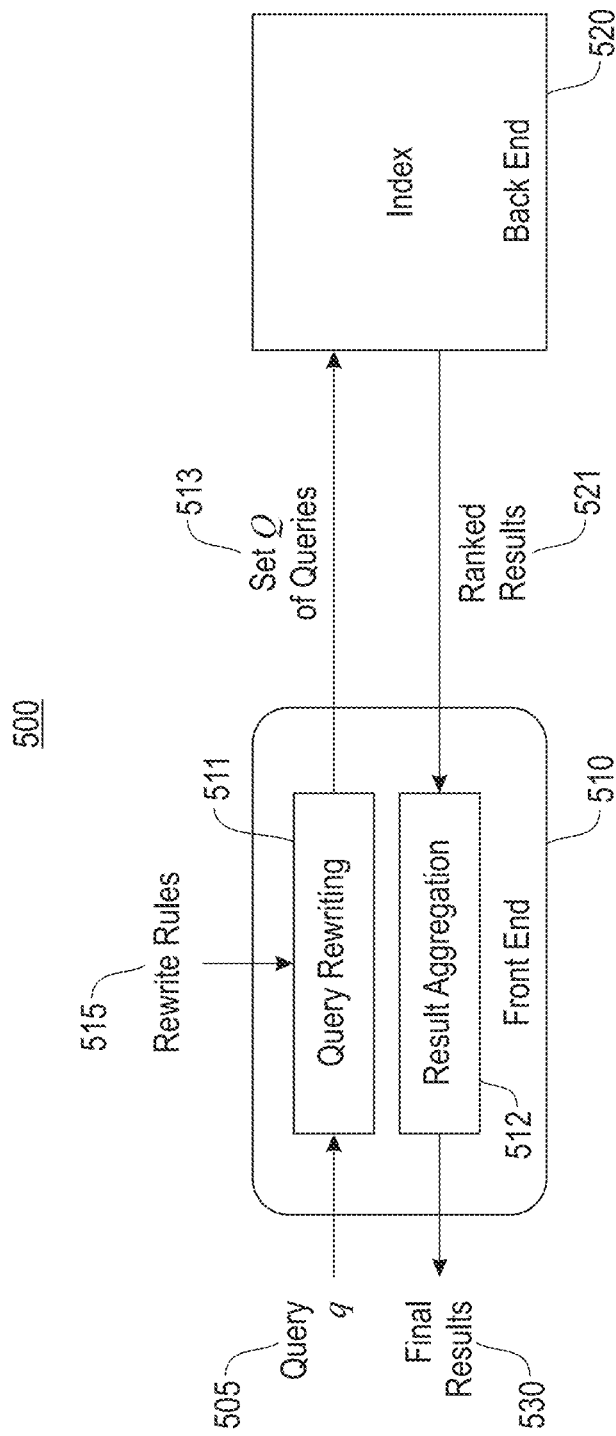
FIG. 5 illustrates a search engine architecture for providing automatic query rewrite rule suggestions, in accordance with an embodiment of the invention.

FIG. 5 shows a search engine 500 architecture runtime flow for providing automatic query rewrite rule suggestions, in accordance with an embodiment of the invention. The front-end 510 takes the input search query q 505 and, by applying rewrite rules 515, produces a set Q of queries 513. In turn, the queries in Q are evaluated against the index in the backend 520, resulting in a list of results for each query. The results are then aggregated together to produce the final ranked list 521. In one embodiment, the search engine 500 leverages structural information from Web pages (such as links, anchor text, headers and titles) in retrieval at the front end 510. The results are aggregated by the result aggregation component 512. In one embodiment, high-quality fields associated with each document are produced, and at runtime these fields are used for ranking. Rewrite rules 515 program the query rewriting component 511 to effect the search as needed. The rewrite rules 515 in the search engine 500 are in the spirit of query-template rules. The search engine 500 returns the final results 530 to the user. Rather than giving an elaborate specification of the rule language, examples are given (in a simplified language). The following rule fires when the query is of the form x info, where x is belongs to a dictionary of products; it introduces a new query with the term info removed.

EQUALS: x[in PRODUCT] info→x

The next rule, involving a regular expression, fires when the query contains the term kword or kspread; it introduces a new query with that term replaced by koffice.

CONTAINS: x(kword|kspread)→koffice

The next rule fires when the query contains msn search, and introduces a new query with msn search replaced by bing.

CONTAINS: msn search→$_+$bing

The plus sign in →$_+$ assigns preference to the new query (containing bing) over the original query (containing msn search). In effect, scores of results for the new query (containing bing) are rewarded compared to those for the original query (containing msn search). For ease of discussion, rewrite rules are shown for the form CONTAINS: s→$_+$t, which are denoted as s→t, where s and t are terms. These particular type of rules are discussed herein, besides their simplicity, it is determined that they are the most commonly used. In one embodiment, the system 100 (FIG. 3) generates a (possibly large) set of candidate rules by pure syntactic means, and classifies them through supervised machine learning.

In one embodiment, a use case involves a query q and a desired match (document) d that is missing from the top results. In one embodiment, the generation of candidate rules s→t is fairly straightforward: a set S of left-hand-side candidates is produced, a set T of right-hand-side candidates are produced, and the Cartesian product S×T are output. The set S consists of all the n-grams (subsequences of n tokens) of q, where n is bounded by a constant (e.g., 5 in one implementation). In principle, T may be chosen as the set of all n-grams of d (which could result in a huge number of candidates, even if n is bounded). In one implementation, T consists of the n-grams just from the high-quality fields of d (produced during back-end 520 (FIG. 5) analysis). In one example, suppose that q is the query "change management info" and one of the considered fields is "welcome to scip strategy & change internal practice." The following are among the candidate rules.

management→scip
change→strategy & change internal
change management→scip strategy.

Even with the restriction to high-quality fields, the above step may generate a large number of candidate rules, most of which are unnatural (hence, useless to an administrator), as illustrated in FIG. 4. In one embodiment, this problem is addressed by taking a machine-learning approach: a set of features are identified and classification models are learned from manually labeled data to classify rules into natural and unnatural ones.

TABLE I

| | Syntactic |
|---|---|
| beginSW (r) | Whether u begins with a stop word |
| endSW (r) | Whether u ends with a stop word |
| \|r\| | Number of tokens in u |
| | Query-Log Statistics |
| Log refFreq(s, t) | Log. of the s-to-t reformulation frequency |
| | Corpus Statistics |
| log freq(u) | Log. of the frequency of u |
| log freq(s∧t) | Log. of concurrence frequency of s and t |
| log HQfreq (u) | Log. of the frequency of u in titles |

Table 1 lists the feature used for classifying rules according to one embodiment. In one embodiment, these features fall into three categories: syntactic features, features based on query-log statistics, and features based on corpus statistics. Suppose that the examined rule is s→t, where s and t are strings of words. The syntactic features can be indicative of the syntactic coherence of a rule. Consider for example the Boolean features beginSW (r) and endSW (r). These features follow that rewrite rules with s or t that begins or ends with stop words are rarely deemed natural. In one embodiment, two types of stop words are considered: stopwords from conventional (English) dictionaries and those from domain-specific dictionaries (including words like "welcome," "index" and "homepage").

In one embodiment, the category of query-log statistics has the single feature log refFreq(s, t), representing common wisdom on query reformulation. In one embodiment, a query log of a four-month usage of a search engine in an enterprise network was used for analysis. For each pair q1 and q2 of queries, refFreq($q_1$, $q_2$) is the number of sessions that begin with the query q1 and contain $q_2$ (posed later than $q_1$ in the session).

In one embodiment, the category of corpus statistics contains numerical statistics on s and t drawn from our engine index. The number freq(u) counts the documents containing u as an n-gram (where u is s in one feature, and t in another). Similarly, freq(s∧t) counts the number of documents containing both s and t as n-grams. In one embodiment, the goal of using log freq(u) and log freq(s∧t) is to capture the popularity of s and t as well as correlation thereof. In one implementation, HQfreq(u) is the frequency of u in our high-quality fields, which roughly reflects the popularity of u in titles.

In one implementation, two classification models over our vector $\vec{f}$ of features are used in system 100. The first model is simply a linear combination, which is trained on manually labeled data via SVM. The second model, which provides a significant improvement over the first, generalizes the first by incorporating a Decision Tree (DT for short). More specifically, in one embodiment the second model is a restricted version of a DT with linear-combination splits that is referenced as rDTLC for short. Given the vector $\vec{f}$ of features, a DT with linear splits has a condition $\Sigma a_i f_i \leq \tau$ in each node (where the $a_i$ and $\tau$ are to be learned in training). In one embodiment, an rDTLC restricts this family by (1) bounding the depth (specifically, in one implementation the tree is of depth 3), and (2) having univariate splits (i.e., one-variable comparisons to thresholds) in all but the bottommost levels.

Figure 6:
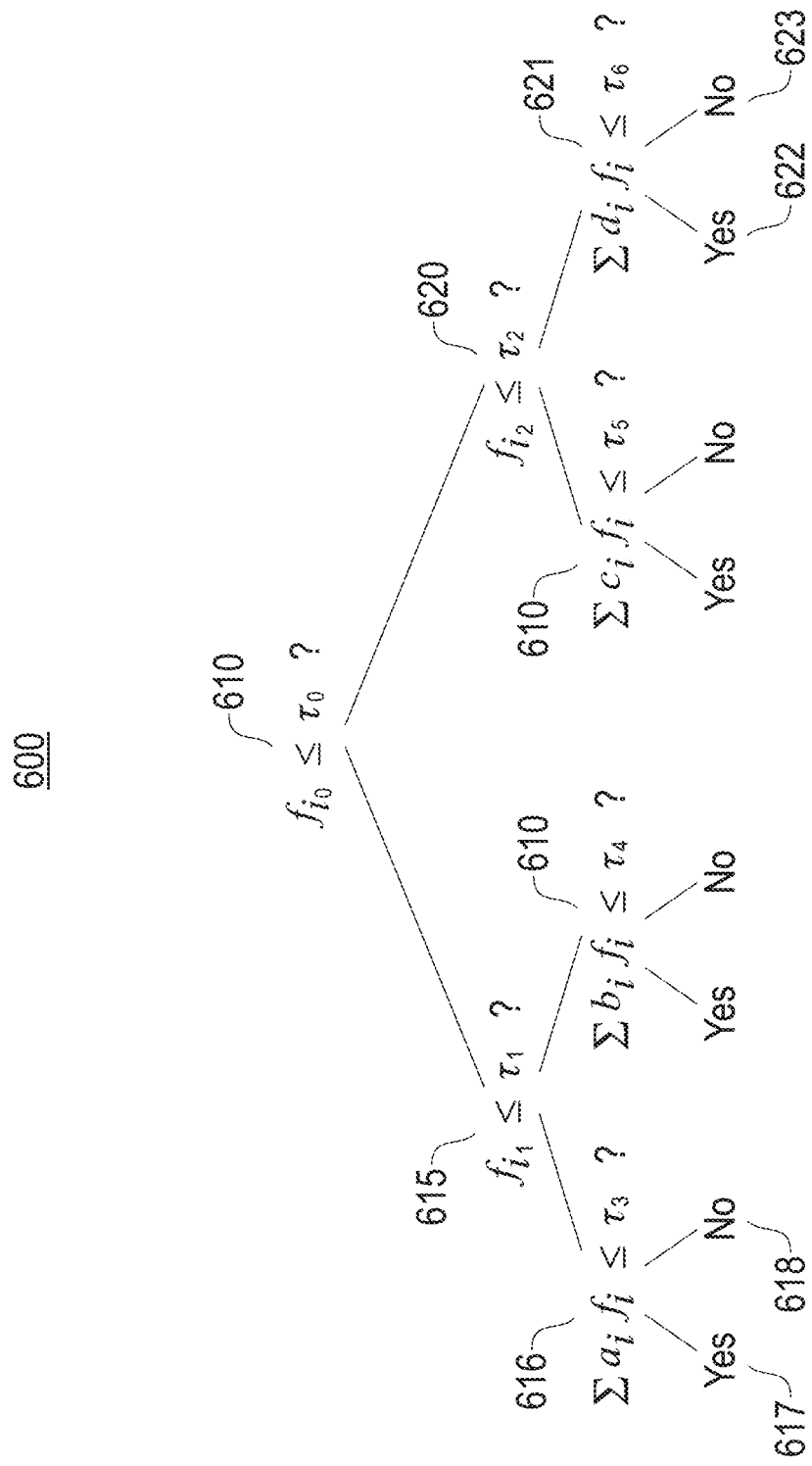
FIG. 6 illustrates an example of a restricted decision tree with linear-combination splits (rDTLC), in accordance with an embodiment of the invention.

FIG. 6 illustrates an example rDTLC 600 according to one embodiment. In the rDTLC 600, the different levels of $\tau_i$ are shown (e.g., $\tau_0$ 610, $\tau_1$ 615, $\tau_2$ 620, $\tau_3$ 616 $\tau_6$ 621) and different decisions are shown (e.g., 617, 618, 622 and 623). Using an algorithm for learning a linear classifier (e.g., SVM), learning an rDTLC can be done straightforwardly by selecting thresholds from the feature values in the training data, trying out every combination of the upper-level thresholds $\tau_i$, and taking the combination that minimizes the classification errors. For efficiency sake, in one embodiment a fix-and-optimize heuristic is used where one threshold at a time is optimized while fixing the others.

In one embodiment, the selection module 340 (FIG. 3) provides for selecting a set of rewrite rules from a large set of previously approved rules, so as to optimize the quality of search. In one embodiment, this task is formulated as a combinatorial optimization problem, where heuristic solutions are used. In one implementation, a rule-administration setting (administration setting) is essentially an abstraction of the search-engine's interplay between queries, rewrite rules, and documents. In one embodiment, an administration setting includes of a set R rewrite rules and a graph G that referenced as a rule-administration graph (administration graph). In one embodiment, a rule in R transforms an input user query q into a rewritten query q'. For brevity and clear distinction between the two types of queries, q (the user query) is referred to as a query, and q' (the rewritten query) is referred to as an r-query. A query and an r-query are simply finite sequences over an infinite alphabet of tokens (words), and a rule s→t in R is defined similarly to the previous sections (i.e., it replaces s, a subsequence of tokens in q, with a sequence t). In one embodiment, the administration graph is a tripartite graph describing the relationships between queries, r-queries and documents.

Figure 7:
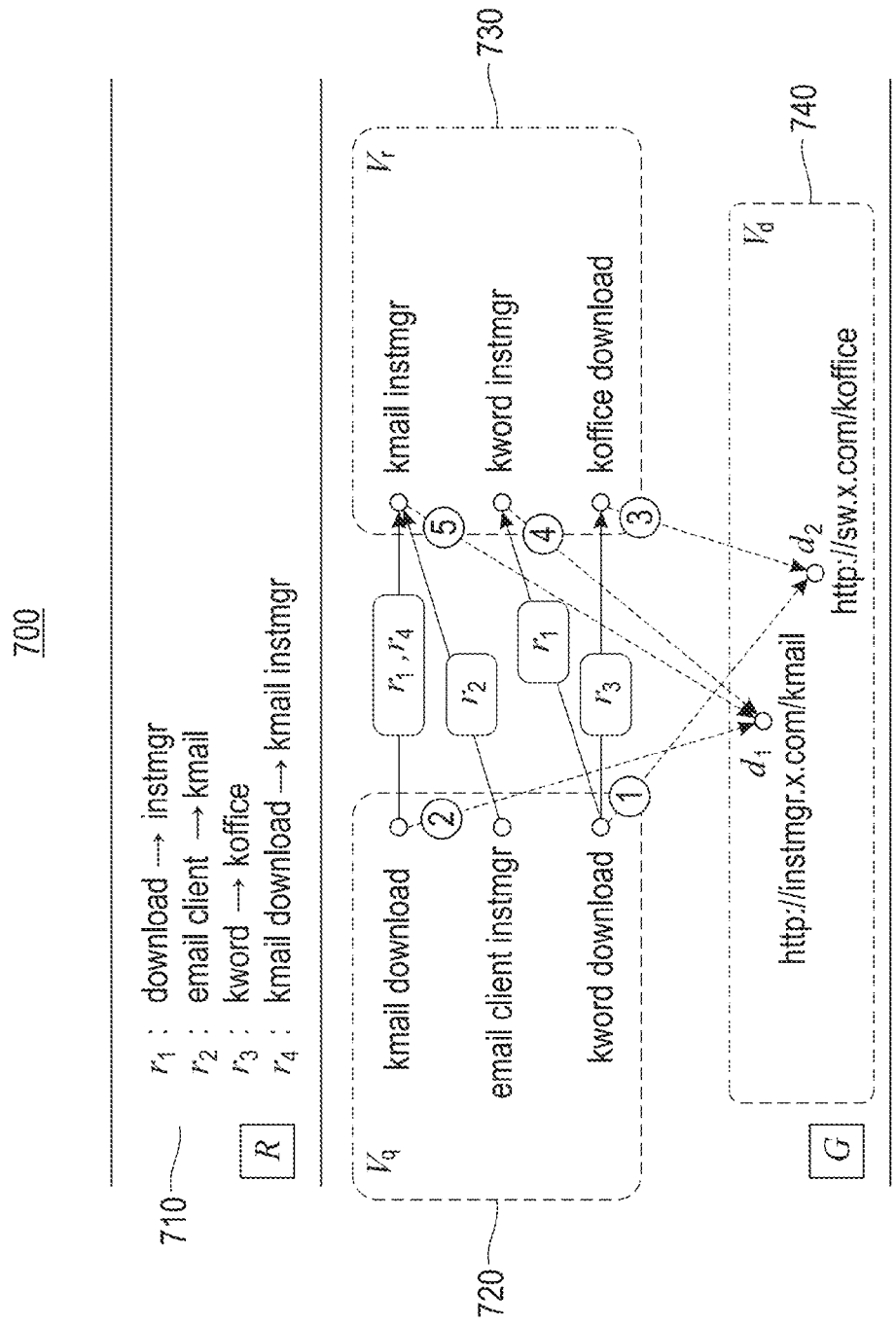
FIG. 7 illustrates an example query rewrite rule graph, in accordance with an embodiment of the invention.

FIG. 7 shows an example query rewrite rule graph 700 administrator setting (R, G) according to one embodiment. The set R 710 is depicted in the top of 700, the graph G 740 is depicted in the bottom of 700. Formally, an administration graph is a directed, edgeweighted graph G=(V,E,w), where:

V is the union of three disjoint sets of nodes: $V_q$ 720 is a set of queries, $V_r$ 730 is a set of r-queries, and $V_d$ 740 is a set of documents.

E is the union of three disjoint sets of edges: $E_{qr} \subseteq V_q \times V_r$ is a set of reformulations, $E_{qd} \subseteq V_q \times V_d$ is a set of query matchings, and $E_{rd} \subseteq V_r \times V_d$ is a set of r-query matchings.

w:E→$R_+$ assigns a positive score to each matching in $E_{qd} \cup E_{rd}$, and is zero on all the edges of $E_{qr}$.

In one embodiment, each side of the tripartite graph G 700 is surrounded by a dashed rectangle. Consider the query q=kmail download in $V_q$. The outgoing edges of this query include the (zeroweight) reformulation to the r-query q'=kmail instmgr in $V_r$, and the query matching to the document $d_1$ (which, for the sake of presentation, is associated with the URL http://instmgr.x.com/kmail) in Vd. The weight of the latter edge is 2, representing the extent to which the engine scores the matching of $d_1$ to q. Observe that a higher score (namely 5) is assigned to the match of $d_1$ to q', as indicated by the weight of the r-query matching (q', $d_1$).

In one implementation, the same string may be represented by two distinct nodes: a query in $V_q$ and an r-query in $V_r$. In one embodiment, a node in $V_q \cup V_r$ has an identifier, which is omitted from the description of the formal model for simplicity.

In one implementation, G is the administration graph, and q∈$V_q$ is a query. It is noted that a path in G from q to d consists of either one edge (in $E_{qd}$) or two edges (one in $E_{qr}$ and the other in $E_{rd}$). If G has a path (of length one or two) from the query q to the document d, then it is denoted by score(d|q) as the maximal weight of a path from q to d. For a query q and a natural number k, it is denoted by $top_k[q|G]$ the series of k documents with the highest w(q, d), ordered in descending w(q, d); if fewer than k documents are reachable from q via a directed path, then $top_k[q|G]$ is restricted to only the reachable documents (hence, $top_k[q|G]$ may have fewer than k documents). In one embodiment, it is implicitly assumed that an underlying linear order among the documents resolve ties.

In one implementation, q is the query kword download. There are two paths from q to the document $d_2$: a direct edge, and through the r-query koffice download. Since the latter has the maximal weight, 3, among all the paths from q to $d_2$, we get score($d_2$|q)=3. Similarly, it can be verified that score ($d_1$|q)=4. In particular, $top_1[q|G]$ is the series ($d_1$), and $top_2$ [q|G] (as well as $top_3[q|G]$) is the series ($d_1$, $d_2$).

In one embodiment, for a rewrite rule r and query q, let r(q) denote the r-query that is obtained from q by applying r. An administration setting is a pair (R, G), where R is a set of rewrite rules and G is an administration graph, such that the set $E_{qr}$ of reformulations of G is the set {(q, r(q))|q∈$V_q$ ∧ r 2 R}. For a reformulation e=(q, q') 2 $E_{qr}$, the set of rules r∈R with r(q)=q' is denoted by R(e).

In one implementation, for the edge $e_1$ from $q_1$=kmail download to $q'_1$=kmail instmgr we have R($e_1$)={$r_1$, $r_4$} (where the $r_i$ are specified in the top of 700). Similarly, for $q_2$=email client download and the reformulation $e_2$=($q_2$, $q'_1$) we have R($e_2$)={$r_2$}.

In one example, consider an administration setting (R, G) in graph 700. In one embodiment, given a subset Ro of R, denoted as $G_{R'}$ the administration graph that is obtained from G by removing from $E_{qr}$ every reformulation e that is produced by none of the rules in R' (i.e., R'(e)=∅).

Figure 8:
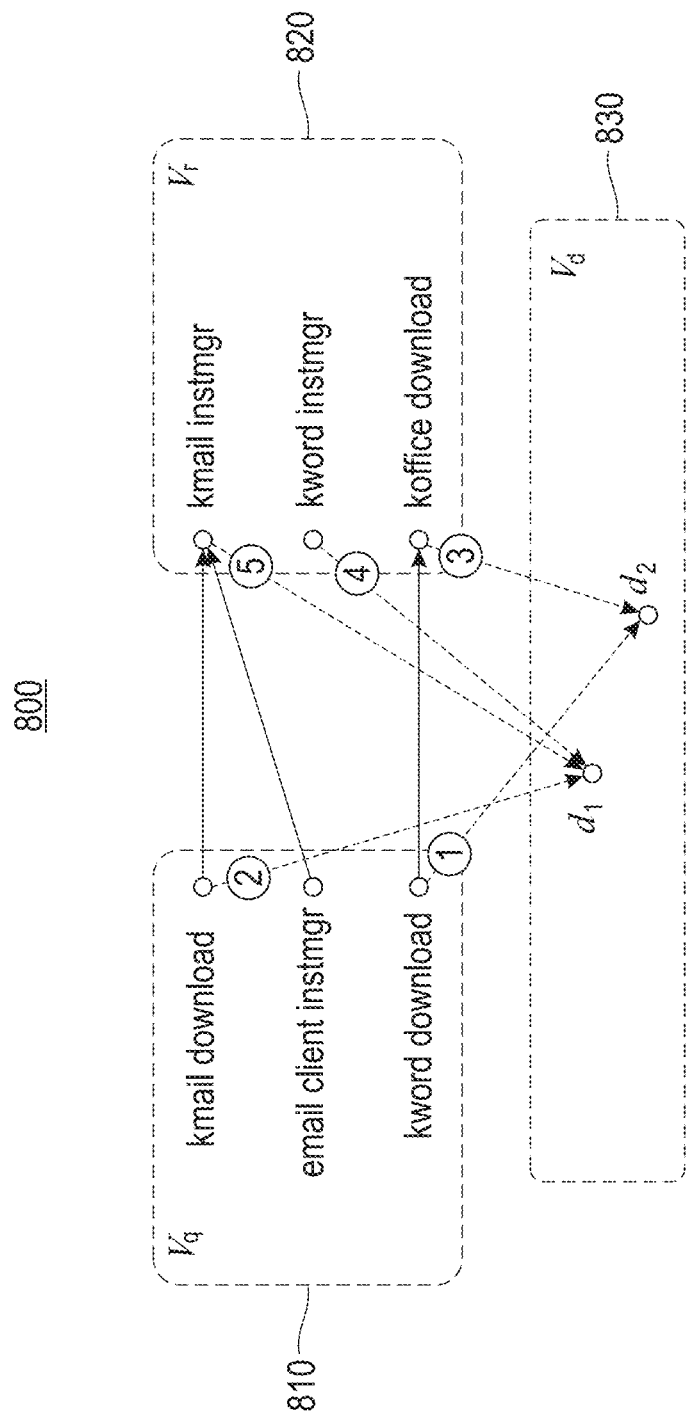
FIG. 8 illustrates another example of a query rewrite rule graph, in accordance with an embodiment of the invention.

In one example, consider the graph 700, and let R' be the set {$r_2$, $r_3$, $r_4$} (i.e., R|{$r_1$}). FIG. 8 shows the graph $G_{R'}$ 800, where $V_q$ 810, $V_r$ 820 and $V_d$ 830 are shown. In one implementation, it is observed that unlike G, the graph $G_{R'}$ has no edge from the query $q_1$=kword download to the r-query $q'_1$=kword instmgr, because R'($e_1$)=∅, where $e_1$ is the edge (q, q') of G (recall that R($e_1$)={$r_1$}). However, there is an edge from the query $q_2$=kmail download to the r-query $q'_2$=kmail instmgr since, although for $e_2$=($q_2$, $q'_2$) the set R'($e_2$) lost $r_1$, this set still contains $r_4$.

In one implementation, let G be an administration graph. In one embodiment, a desideratum is a function δ:Vq→$2^{Vd}$ that maps each query q∈$V_q$ to a set δ(q)⊆$V_d$ of desired matches. In one implementation, a quality measure μ determines a quality score for each query q, for a natural number k of choice, based on the series $top_k[q|G]$ and the set δ(q). This score is denoted by μ($top_k[q|G]$, δ(q)). As an example, precision at k is the following μ:

$$\mu_k(top_k[q|G], \delta(q)) = \begin{cases} \frac{|top_k[q|G] \cap \delta(q)|}{|top_k[q|G]|} & \text{if } top_k[q|G] \neq \emptyset; \\ 0 & \text{otherwise.} \end{cases} \quad (1)$$

As another example, $DCG_k$ (without labeled relevance scores) is the following μ: $\mu_k$ ($top_k[q|G]$, $$\delta(q)) = \sum_{i=1}^{j} \frac{2^{a_i} - 1}{\log_2(i+1)} \quad (2)$$

where $top_k[q|G]=(d_1, \ldots, d_j)$, and each $a_i$ is 1 if $d_i \in \delta(q)$ and 0 otherwise.

In one embodiment, the $top_k$ quality of G, denoted $\mu_k(G,\delta)$, is obtained by summing up the scores across all the queries:

$$\mu_k(G,\delta) \stackrel{def}{=} \Sigma_{q \in V_q} \mu(top_k[q|G],\delta(q)) \quad (3)$$

For readability, $\delta(q)$ and $\delta$ are omitted from the term $\mu_k(top_k[q|G], \delta(q))$ and $\mu_k(G,\delta)$, respectively, when $\delta$ is clear from the context. In one example, consider the following desideratum $\delta$ for:

δ(kmail download)=δ(email client instmgr)={$d_1$}δ
(kword download)={$d_2$}.

In one implementation. It can be verified that $top_1[q|G]=(d_1)$ for all three queries q in $V_q$. Thus, for each of the functions $\mu$ of Equations (1) and (2) we get $\mu_1(G)=1+1+0=2$. In one implementation, consider the graph $G_{R'}$ 800 of FIG. 8. It is noted that $top_1[q|G]=(d_1)$ for q=kmail download and q=email client instmgr, but $top_1[q|G]=(d_2)$ for q=kword download. In particular, $\mu_1(G_{R'})=3$ for the above two functions $\mu$.

In one implementation, abstract rule optimization is the following problem. Given an administration setting (R, G), a desideratum δ, and a natural number k, the goal is to find a subset S of R that maximizes $\mu_k(G_S)$; that is, S is such that $\mu_k(G_S) \geq \mu_k(G_{R'})$ for every subset R' of R. Such S is an optimal solution. A weaker goal is to find an α-approximate optimal solution, where α≥1 is either a number or a numeric function of the input; such a solution is a set $S \subseteq R$ that satisfies $\alpha \cdot \mu_k(G_S) \geq \mu k(G_{R'})$ for all R'⊆R.

In one example, suppose that μ is one of the functions of Equations (1) and (2), and consider again the administration setting (R, G) of graph 700. Suppose that the input for abstract rule optimization contains, in addition to (R, G), the desideratum δ of Example 4.6 and k=1. In FIG. 8 graph GR' 800 was shown where R'={$r_2, r_3, r_4$}). As $\mu_1(G_{R'})=3$ is clearly optimal, R' is an optimal solution in this case.

In one implementation, to simplify the discussion on computational complexity, it is assumed that μ is fixed (i.e., not part of the input), and that $\mu(top_k[q|G])$ may be computed in polynomial time. Next, it is noted that abstract rule optimization is hard to approximate. In one implementation, the following (reasonable) assumption is made on the quality measure μ: there is a positive constant c, such that for all queries q, if δ(q) consists of exactly one document then $\mu(top_1[q|G])=c$ if $top_1[q|G]=\delta(q)$, and $\mu(top_1[q|G])=0$ otherwise (i.e., if $top_1[q|G]$ does not contain the single document in δ(q)). It is observed that this assumption holds in standard measures that are parameterized by a restriction to the top-k results (assuming that different results are not weighted by different levels of relevancy), such as $DCG_k$, normalized $DCG_k$, and precision at k. It is noted that a function with this property is referred to as reasonable at one. The following theorem states that abstract rule optimization is extremely hard (to even approximate), no matter which quality measure μ is used, as long as μ is reasonable at one. The proof is given in the appendix. Whenever μ is reasonable at one, abstract rule optimization is non-deterministic polynomial-time (NP)-hard to approximate by any constant factor, or even by $|Vq|^{1-\in}$ for every ∈>0.

In one embodiment, the selection module 340 of system 100 uses a first process denoted as globally greedy and a second process denoted as locally greedy. FIG. 9 shows a globally greedy process 900 according to one embodiment. In one implementation, the globally greedy process 900 (denoted as G-Greedy) applies the following approach. In one embodiment, the G-Greedy process 900 initializes an empty solution S⊆R (line 1), and iteratively adds to S the best missing rule r (found in line 5). In one implementation, the best rule r is such that the difference Δ between the quality obtained by adding r, namely $\mu_k(G_{S \cup \{r\}})$, and the current quality, namely $\mu_k(G_S)$, is maximal. The G-Greedy process 900 terminates (and returns S) once Δ is non-positive (hence, no improving rule can be found). In one implementation, it is found that the globally greedy process 900 performs very well in terms of the quality of the returned solution S. However, the G-Greedy process 900 is extremely slow, due to its inherent cubic time: the loop of line 3 can take up to |R| iterations, and then line 4 (finding r) entails traversing over all r∈R\S and computing $\mu_k(G_{S \cup \{r\}})$, which requires computing $top_k[q|G]$ (and summing up the $\mu(top_k[q|G])$) for all queries $q \in V_q$.

FIG. 10 shows a local greedy process 1000 according to one embodiment. In one implementation, the locally greedy process 1000 is denoted as L-Greedy. Similar to the globally greedy process 900, the locally greedy process 1000 initializes an empty solution S⊆R (line 1), incrementally adds rules to it (lines 2-6). The main difference between the G-Greedy process 900 and the L-Greedy process 1000 is that in the main loop of the locally greedy algorithm 1000, the rule r (to add to S) is searched in a practically tiny subset of the set R of rules (rather than in all of R as with the G-Greedy process 900). More specifically, in the L-Greedy process 1000, line 2 constructs the set T of all tasks, where a task is a pair (q, d) such that q is a query (in $V_q$) and d is a desired document for q (i.e., q∈δ(d)). Then, the main loop (line 3) traverses all tasks in an arbitrary order. For a considered task (q, d), we define $rel_k(q, d)$ to be the set of all the rules r that are relevant to the task, that is: (1) r is on a path from q to d, or more formally, for some q'∈$V_r$ we have e=(q, q')∈$E_{qr}$, r∈R(e), and (q', d) 2 $E_{rd}$, and (2) taken alone r can push d to the top-k results of q, or more formally, $d \in top_k[q|G_{\{r\}}]$. In line 4, a rule that maximizes $\mu_k(G_{S \cup \{r\}})-\mu_k(G_S)$ is added to S, provided that this maximum value is positive.

In one embodiment, in both the globally greedy process 900 and the locally greedy process 1000, a significant portion of the computation takes place on computing the quality of the system on intermediate sets of rules (that is, the computations of $\mu_k(G_S)$ and $\mu_k(G_{S \cup \{r\}})$ in line 4 of G-Greedy process 900 and line 4 of L-Greedy process 1000). In one implementation, this computation is done to obtain the difference $\mu_k(G_{S \cup \{r\}})-\mu_k(G_S)$, where S is the current set of rules and r is a considered candidate rule. Let Δ(S, r) denote this difference. In one embodiment, the computation is optimized by observing that Δ(S, r) is effected by only a few of the queries, namely those on which r fires.

In one embodiment, a query q, a rule r and a set S⊆R are considered. Define $\Delta(q, S, r)=\mu(top_k[q|G_{S \cup \{r\}}])-\mu(top_k[q|G_S])$. In one embodiment, $\Delta(S, r)=\Sigma_{q \in V_q}\Delta(q, S, r)$. In one implementation, $V_q(r)$ is the set of queries q∈$V_q$, such that r∈R(e) for some edge e∈$E_{qr}$ emanating from q. In one implementation, Δ(q, S, r)=0 whenever q∉$V_q(r)$, and therefore $\Delta(S, r)=\Sigma_{q \in V_{q(r)}}\Delta(q,S,r)$.

In one embodiment, the query suggestion process 350 (FIG. 3) optimizes query rewrite suggestions by maintaining each $\mu(top_k[q|G_S])$ for the current S. In one implementation, at the beginning $\mu(top_k[q|G\emptyset])$ is computed. When a rule r is considered, the query suggestion process 350 iterates over the queries in $V_q(r)$ and computes $\mu(topk[q|G_{S \cup \{r\}}])$, thus obtaining Δ(q, S, r). In one embodiment, the query suggestion process 350 sums up all Δ(q, S, r) into Δ(S, r) to be used in the next part of the query suggestion process 350. If it is decided to add r to S, then $\mu(top_k[q|G_{S \cup \{r\}}])$ is updated by adding Δ(q, S, r). Hereafter, the optimized versions of the G-Greedy and process 900 and the L-Greedy process 1000 are denoted by G-Greedy-opt and L-Greedy-opt, respectively.

It is noted that in practical search systems, queries may carry different levels of importance, which may be expressed by means of query weights. As an example, this weight of a query can be the frequency in which the query is posed. In one implementation, weights are used that are frequencies derived from query logs. In one embodiment, the query suggestion process 350 assigns a weight w(q) to each query $q \in V_q$, and in the definition of $\mu_k(G)$, each addend $\mu(top_k[q|G])$ is multiplied by w(q). In one embodiment, the greedy processes 900 and 1000 automatically adjust to weights by using the weighted $\mu_k$. An intuitive traversal order on T in the locally greedy algorithm 1000 is by decreasing w(q).

In one implementation, the search engine 500 (FIG. 5) is used for empirically evaluating solutions using real example datasets provided by administrators. In one example, a dataset was obtained from a list of 1894 suggested matches provided by a CIO Office of a focus enterprise system, where a suggested match consists of a query q and a document d that is a desired top match for q. Generally, the queries involved in the suggested matches are highly frequent, and hence are recorded for quality maintenance. Note that the same query may be matched against multiple documents, and the same document may be suggested for multiple queries. As described above, by analyzing the high-quality fields (e.g., titles and URLs) of desired documents, for each suggested match, a set of query-rewrite rules are generated, each of which, in the absence of any other rule, is capable of pushing the desired document up to the top-5 results for the given query. In one example, this produced a total of 11907 rules. In one example, the search engine 500 ran on a Linux SUSE (64-bit) server with a 4-core Intel Xeon (2.13 GHz) processor and 48 GB of memory. In this example, system 100 is implemented in Java 1.6 and ran with 12 GB allocated memory.

In one implementation example, classification models for recognizing natural rules are evaluated. Among all generated rules, 1187 rules were randomly selected and manually labeled as either natural or unnatural. Using this labeled dataset, the accuracy of the classifiers SVM and rDTLC was evaluated. The results reported were consistently obtained by performing a 5-folder cross validation. In one example, exploration of how the classifiers perform on rules for more popular suggested matches is analyzed. In one example, four months of query logs are used in the focus enterprise network and the popularity of each suggested match was estimated by counting the number of sessions that have a click on the suggested document for the corresponding query. Therefore, each quality measure has two versions: the unweighted version is denoted by uw and the weighted version is denoted by w. In one implementation, the two classifiers were retrained by incorporating the weights on rules, thereby obtaining a third version denoted by wt (weighted training). It is noted that whether or not to train the classifier with weights is a matter of a choice that depends on the specific scenario, and for that reason both the w and the wt versions are evaluated in the following examples.

Figure 11:
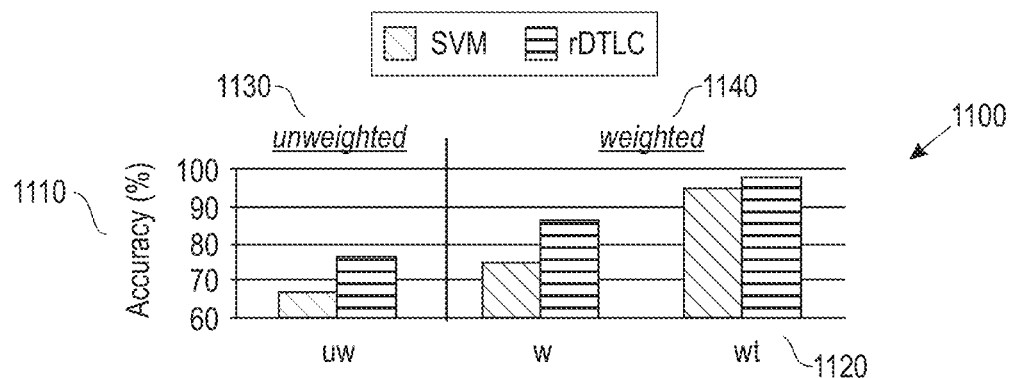
FIG. 11 illustrates an example graph showing a ratio of correctly classified rules for support vector machines (SVM) and rDTLC, in accordance with an embodiment of the invention.

FIG. 11 shows an example graph 1100 that reports the accuracy (i.e., the ratio of correctly classified rules) for SVM and rDTLC according to one embodiment. In the graph 1100, accuracy 1110 versus correctly classified rules for unweighted 1130, weighted 1140 and wt 1120 are shown. As can be seen, when trained without weights, rDTLC outperforms SVM by about 10% for both the unweighted 1130 and weighted 1140 measures. In one implementation, when the classifiers are trained with weights, rDTLC shows a smaller improvement (about 3%), and both classifiers achieve high accuracy.

It should be noted that even with the classification, the number of natural rules may still be large. An administrator may be interested in only the top-k rule suggestions for some k. In one implementation the naive strategy of ranking the top-k candidate rules by decreasing confidence of the classifier at hand is explored. In one embodiment, it is observed that this naive approach is beneficial as compared to a random selection of k candidates (a strategy denoted as RAID).

Figure 12:
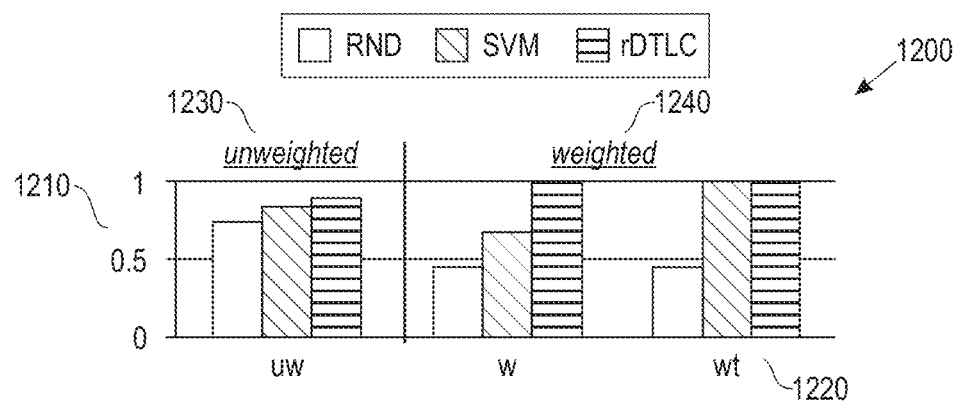
FIG. 12 illustrates an example graph showing mean reciprocal rank (MRR) of different rankers for rule ranking, in accordance with an embodiment of the invention.

FIG. 12 shows an example graph 1200 of a mean reciprocal rank (MRR) 1210 of the different rankers. In graph 1200, the unweighted suggestions 1230, weighted suggestions 1240, and wt 1220 are depicted.

Figure 13:
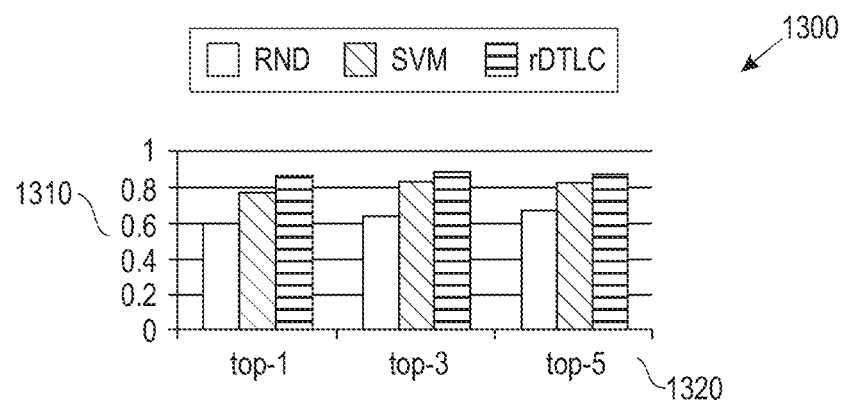
FIG. 13 illustrates an example graph showing an unweighted normalized discounted cumulative gain at the top-k results ($nDCG_k$) for rule ranking, in accordance with an embodiment of the invention.
Figure 14:
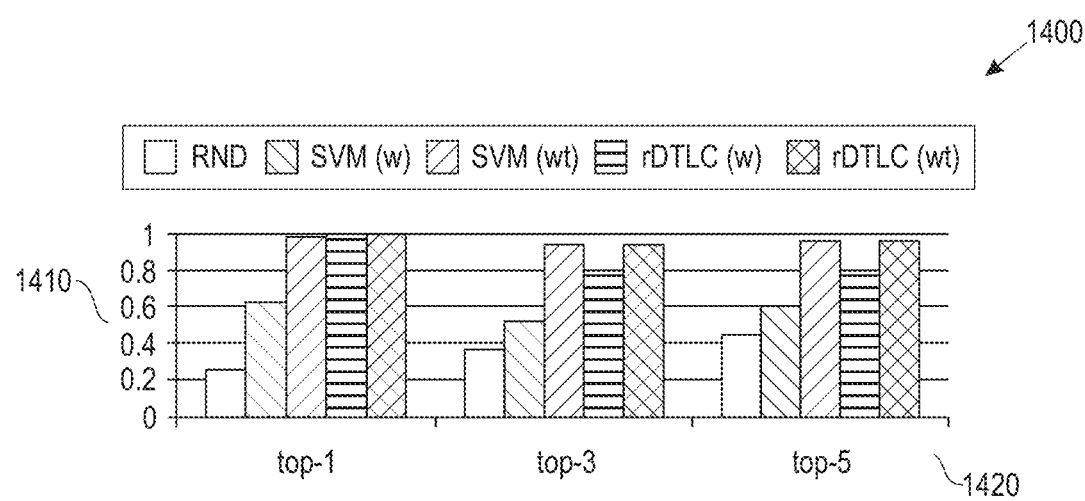
FIG. 14 illustrates an example graph showing a weighted $nDCG_k$ for rule ranking, in accordance with an embodiment of the invention.

FIG. 13 illustrates an example graph 1300 showing an unweighted normalized discounted cumulative gain at the top-k results ($nDCG_k$) 1320 for rule ranking versus the scale 1310, in accordance with an embodiment of the invention. FIG. 14 illustrates an example graph 1400 showing a weighted $nDCG_k$ 1420 for rule ranking versus the scale 1410, in accordance with an embodiment of the invention. In FIGS. 13-14 $nDCG_k$), k=1, 3, 5 for the unweighted and weighted cases, respectively. It can be seen that when the classifiers are not retrained with weights, rDTLC performs significantly better than SVM (and RND), but its advantage over SVM disappears when they are retrained with weights; in particular, when trained with weights both are almost always capable of suggesting natural rules for all k=1, 3, 5.

In one implementation, several datasets were constructed from a collection of suggested matches. Each dataset is an administration setting constructed by selecting a subset M of the suggested matches, and a subset R of the rules automatically created for M. It is noted that M implies a desideratum δ. In one embodiment, once M and R are selected by the selection module 340, the administration graph G is constructed as follows. The queries in M form the set $V_q$ of queries. The set $V_r$ of r-queries is obtained by applying the rules of R to the queries in $V_q$. The set $V_d$ of documents contains all the documents in M, as well as the top-5 results for each query and r-query in $V_q \cup V_r$, as obtained by invoking the search engine 500 (FIG. 5) without rewrite rules. The edges of G are defined in the obvious manner.

In one example, the G-Greedy process 900 (FIG. 9) and L-Greedy process 1000 (FIG. 10) and their optimized versions G-Greedy-opt and L-Greedy-opt. In one implementation, several baseline processes were considered: G-Random, L-Random and All-Rules. G-Random and L-Random are similar to their greedy counterparts, except that their selection of rules is random. More precisely, in one implementation G-Random selects a random subset of rules among all the rules, and L-Random randomly selects an effective rule for each suggested match. The process AllRules simply selects all the rules. Though trivial, it is noted that AllRules represents a common practice of the search administrators at the focus enterprise.

In one embodiment, two quality measures μ are considered: the $nDCG_k$, and the MRR. It should be noted, in one embodiment since the administration graph is restricted to the top-5 matches for each query and r-query, MRR is restricted to the top-5 results as well. To estimate the gap between the solution provided by each of the processes and the optimal solution, in one embodiment an upper bound is computed on the optimum for each quality measure μ, as follows. The sum of Equation (3) is evaluated, where each addend $\mu(top_k[q|G]$, δ(q)) is computed as if each suggested match is ranked as high as possible using a rule from the our collection. In one embodiment, this bound is allowed to place two documents in the same rank. Note that this number is not smaller than, and may be strictly larger than, the optimum (i.e., $\mu_k(G_S)$ for an optimal solution S).

In one implementation, the selection module 340 (FIG. 3) uses both unweighted and weighted quality measures. In one embodiment, in the weighted version, each query is weighted by the number of sessions where it is posed, as recorded in the four months of query logs used for an evaluation. In one embodiment, for the unweighted version, the L-Greedy process 1000, L-Greedy-opt and L-Random iterate over the suggested matches (which form the set T in FIG. 10) in a random order obtained by applying a random permutation thereof. In one embodiment, for the weighted version, the iteration over the suggested matches is ordered by decreasing weights of the involved queries.

In one example, the selection module 340 uses the labeled dataset obtained by taking as M the suggested matches that were used for labeling rewrite rules, and as R the set of rules that are manually labeled as natural. In one example, the resulting administration graph contains 135 queries, 300 r-queries, 423 documents, and a total of 1488 edges. Note that only a small portion of the suggested matches were used for labeling; the others, for which the rules are not labeled, are used later in further implementations.

Figure 15:
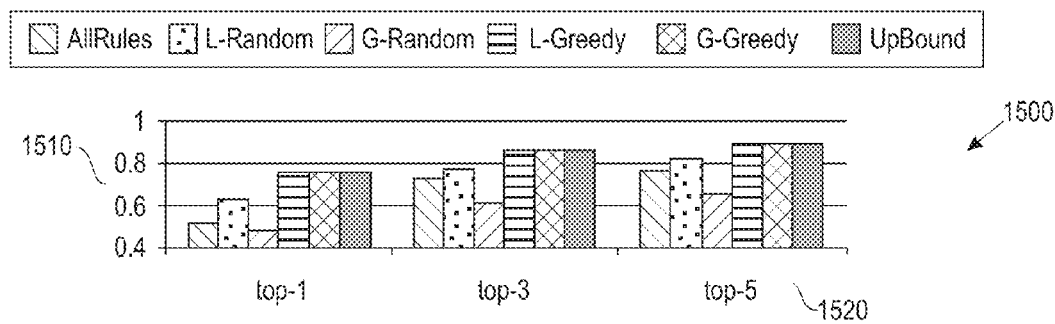
FIG. 15 illustrates an example graph showing an unweighted $nDCG_k$ for a labeled dataset, in accordance with an embodiment of the invention.
Figure 16:
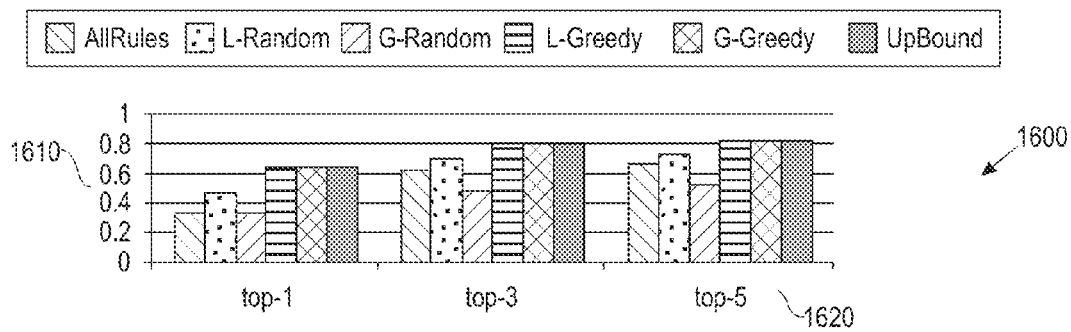
FIG. 16 illustrates an example graph showing a weighted $nDCG_k$ for a labeled dataset, in accordance with an embodiment of the invention.
Figure 17:
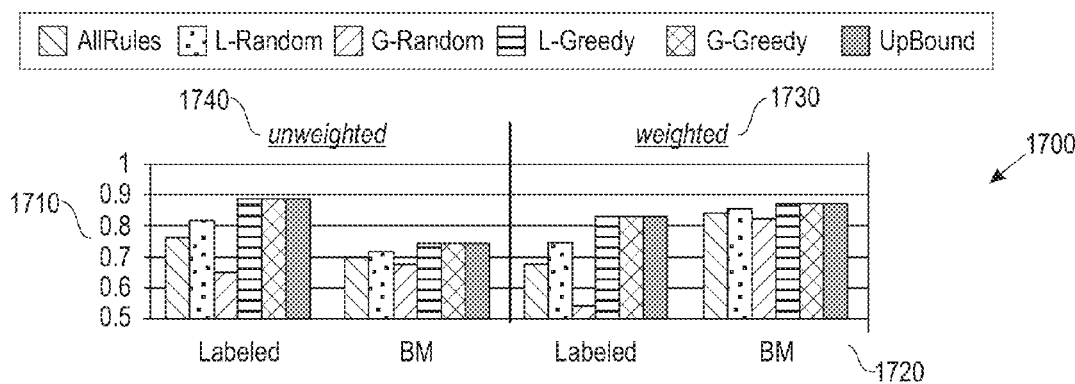
FIG. 17 illustrates an example graph showing a MRR of different rankers for a labeled dataset, in accordance with an embodiment of the invention.

In one example, the qualities of solutions produced by each of the processes are evaluated. FIG. 15 illustrates an example graph 1500 showing an unweighted $nDCG_k$ 1520 for a labeled dataset with k=1, 3, 5 versus scale 1510 according to one embodiment. FIG. 16 illustrates an example graph 1600 showing a weighted $nDCG_k$ 1620 for a labeled dataset with k=1, 3, 5 versus scale 1610. FIG. 17 illustrates an example graph 1700 showing MRR 1720 of different rankers for a labeled dataset versus scale 1710 for weighted 1730 and unweighted 1740 cases. The groups labeled with BM are addressed below. It is observed that on all quality measures, L-Greedy and G-Greedy score significantly higher than the other alternatives. In one implementation, the greedy processes reach the upper bound, and hence provide optimal solutions.

In one example, the solutions are explored in the presence of suggested matches that hit the top search results without requiring rules (yet, they can be effected by introducing rules). In one implementation, this represents the typical scenarios that a search administrator needs to address problematic queries without compromising the overall search quality. In one example, the set M is enhanced, from the construction of the labeled dataset, with 373 such suggested matches that are used as a benchmark. The groups of bars labeled with BM in FIG. 17 report the MRR for both the unweighted and the weighted cases. Note that the greedy processes get better scores than the other alternatives, and again reach the upper bound. But now, the other alternatives get high scores as well, since many suggested matches in the benchmark are not affected by the rules in R. The results for $nDCG_k$ show a similar picture.

In one example, the execution costs of the different processes are compared. In one example, AllRules, G-Random and L-Random entail a negligible running time (less than 0.2 ms). In one implementation, the globally and locally greedy processes are used, and the contribution of the optimization is examined.

TABLE 1

| | $\mu$ = MRR (ms) | | |
|---|---|---|---|
| Process | Labeled | BM | Extended |
| G-Greedy | 25193 | 82566 | >1 month |
| G-Greedy-opt | 2911 | 7719 | >20 hours |
| L-Greedy | 404 | 3517 | 1648137 |
| L-Greedy-opt | 39 | 110 | 87484 |

TABLE 2

| | $\mu$ = nDCG, k = 1 (ms) | | |
|---|---|---|---|
| Process | Labeled | BM | Extended |
| G-Greedy | 26356 | 82595 | >1 month |
| G-Greedy-opt | 2638 | 6896 | >20 hours |
| L-Greedy | 399 | 3462 | 3522894 |
| L-Greedy-opt | 38 | 112 | 124613 |

Table 2 summarizes the running times for two different combinations of $\mu$ and k for one implementation. The columns entitled "Labeled" and "BM" refer to the labeled dataset and the one enhanced with the benchmark, respectively. The columns entitled "Extended" are addressed below. It may be observed that the locally greedy processes are over one order of magnitude faster than their globally greedy counterparts. In addition, the optimized versions are also almost one order of magnitude faster than their unoptimized counterparts. In one embodiment, the optimized version of the local greedy process is capable of returning an optimal solution in real time for the typical usage scenarios.

The above implementations demonstrate the effectiveness and feasibility of the greedy processes used for selecting rewrite rules by the selection module 340. In order to further evaluate the scalability of the greedy processes, one implementation comprises a construction of a larger extended dataset. In one implementation, to create the extended dataset, for M the set of all the suggested matches is used, and as R the set of all the rules automatically generated for them (including those that are not labeled). In one example, rhe resulting administration graph contains 1001 queries, 10990 r-queries, 4188 documents, and a total of 36986 edges.

In one example, the running times for two different combinations of $\mu$ and k are shown Table 2, now by the columns entitled "Extended." In one implementation, the globally greedy processes (including the optimized one) do not scale to the extended dataset. For the locally greedy processes, the improvement achieved by the optimization is by over an order of magnitude.

Figure 18:
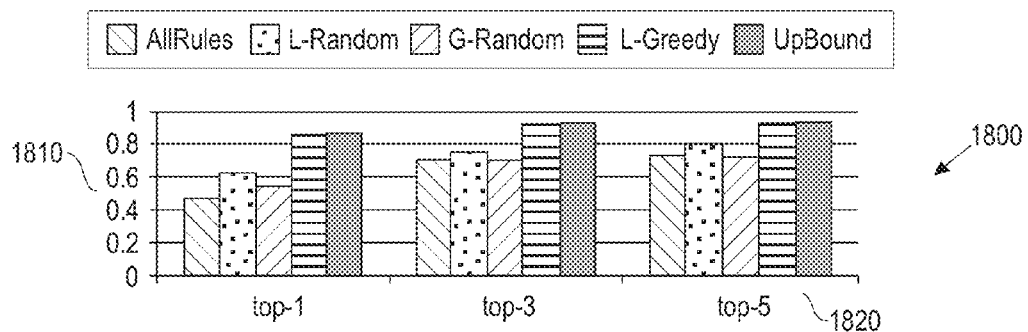
FIG. 18 illustrates an example graph showing an unweighted $nDCG_k$ for an extended dataset, in accordance with an embodiment of the invention.
Figure 19:
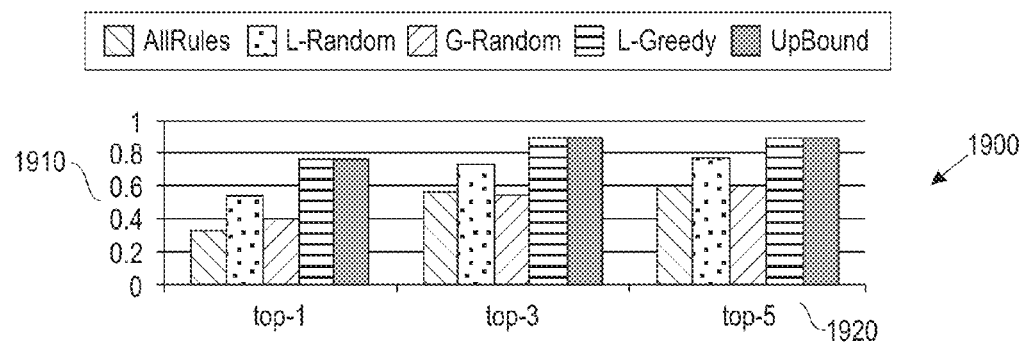
FIG. 19 illustrates an example graph showing a weighted $nDCG_k$ for an extended dataset, in accordance with an embodiment of the invention.
Figure 20:
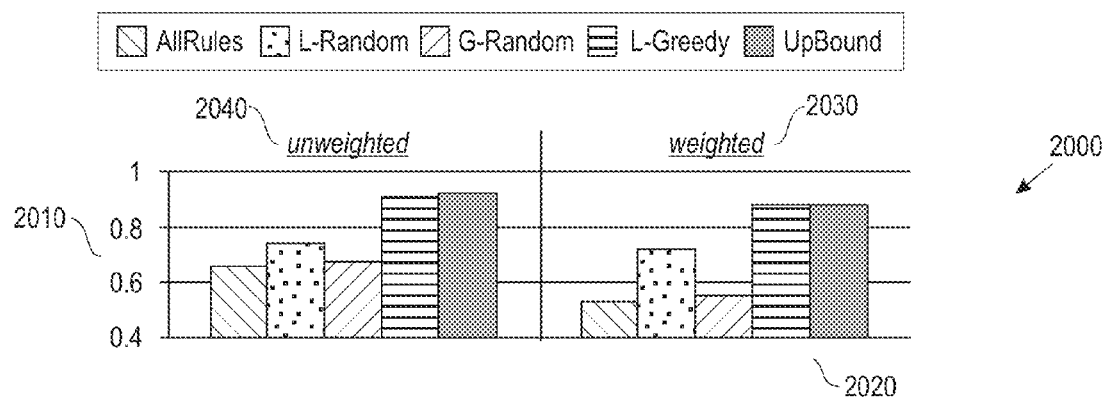
FIG. 20 illustrates an example graph showing a MRR of different rankers for an extended dataset, in accordance with an embodiment of the invention.

In one example, the quality of the solutions over the extended dataset is determined. FIG. 18 illustrates an example graph 1800 showing an unweighted $nDCG_k$ 1820 with k=1, 3, 5 for an extended dataset versus scale 1810, in accordance with an embodiment of the invention. FIG. 19 illustrates an example graph 1900 showing a weighted $nDCG_k$ 1920 with k=1, 3, 5 for an extended dataset versus a scale 1910, in accordance with an embodiment of the invention. FIG. 20 shows an example graph 2000 of the MRR 2020 for both unweighted 2040 and weighted 2030 cases versus a scale 2010. In one implementation, the L-Greedy process outperforms the other alternatives on all quality measures. The gap between L-Greedy process and the upper bound is generally around one percent, and is barely notable. The results of the example demonstrates that even in the extreme case where the search administrator chooses all suggestions, the optimized version of the locally greedy process may still find optimal solutions within a reasonable amount of time (e.g., about 2 minutes).

In one embodiment, the rule-based architecture of system 100 (FIG. 3) provides search administrators with the means of adapting the search engine to the content and dynamics of the network (e.g., an enterprise network, etc.). The embodiments provide for automation in the manual practice of administrators for determining query rewrite rule suggestions based on machine-learned classifiers for rules. One embodiment provides for using the selection module 340 (FIG. 3) for selecting rules, from a given collection, with by optimizing the quality on a benchmark. One implementation provides heuristic processes to accommodate its hardness. In other embodiments, the system 100 may be implemented in every search system that supports administration by rewrite rules.

Figure 21:
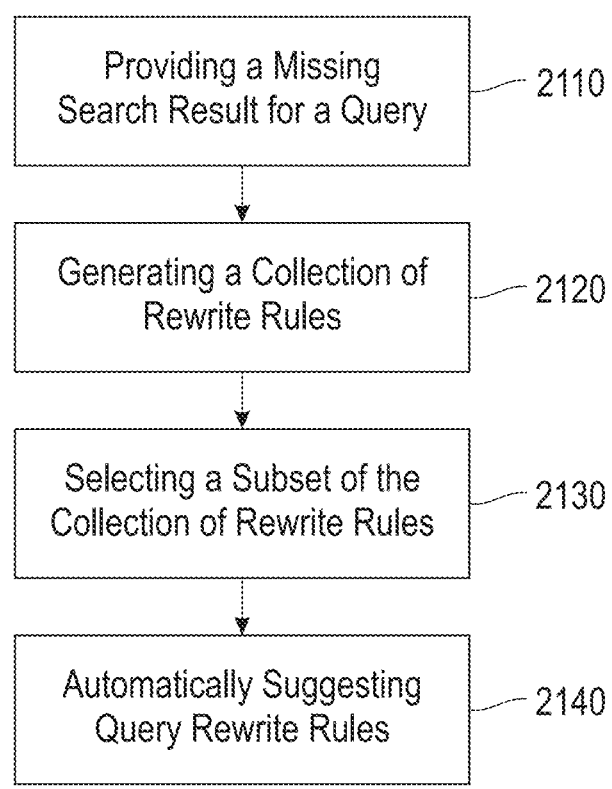
FIG. 21 is a block diagram showing a process for automatically suggesting query rewrite rules, in accordance with an embodiment of the invention.

FIG. 21 illustrates a flowchart of an example process 2100 for automatically suggesting query rewrite rules according to one embodiment. In process block 2110, a missing search result is provided for a query, for example, by the query collection module 320 in FIG. 3. In process block 2120, a collection of rewrite rules are generated, for example, by the rewrite module 330 of system 100. In process block 2130, a subset of the collection of rewrite rules are selected, for example, by the selection module 340 of system 100. In process block 2140, query rewrite rules are automatically suggested, for example, by the query suggestion process 350 of system 100.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

When the system 100 is implemented in software, as is shown in FIG. 2, it should be noted that the system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the system 100 of the present invention on server 11 and database 12 using for example, but not limited to, an Internet browser. The information accessed in server 11 and database 12 can be provided in a number of different forms including, but not limited to, ASCII data, WEB page data (i.e., HTML), XML or other type of formatted data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
 providing a missing search result for a query;
 generating a collection of semantically coherent rewrite rules based on the missing search result, said generating comprising:
  selecting a plurality of candidates comprising subsequences of the query and subsequences of particular fields of a document;
  invoking a search engine using the plurality of candidates for providing a plurality of search results;
  filtering out particular candidates that fail to achieve a desired search result; and
  classifying remaining candidates into natural candidates and unnatural candidates based on a learned classifier; and
 suggesting query rewrite rules for document searching based on the classified remaining candidates.

2. The method of claim 1, wherein the learned classifier uses features from corpus statistics, query-log statistics and linguistic resources.

3. The method of claim 1,
 for benchmark data comprising a set of queries and desired results for the queries and a set of rewrite rules, selecting a subset of the collection of semantically coherent rewrite rules based on a plurality of constraints and a utility function.

4. The method of claim 3, wherein selecting the subset of the collection of semantically coherent rewrite rules comprises:
 generating a graph for capturing an interplay between search queries rewrite rules, query reformulations and documents;
 selecting a sub-graph based on a scoring function; and
 selecting the subset of the collection of semantically coherent rewrite rules based on a heuristic process applied to the selected sub-graph.

5. The method of claim 4, wherein the heuristic process provides for one of a global rule exhaustion process and a local rule exhaustion process.

6. The method of claim 5, wherein the heuristic process further comprises using weighted queries based on frequencies derived from query logs.

7. The method of claim 1, wherein the particular fields comprise any fields containing informative description related to the document.

8. The method of claim 7, wherein the suggested query rewrite rules are automatically suggested for enterprise system document searching.

9. The method of claim 8, wherein queries are conducted on an intranet of the enterprise system.

10. The method of claim 1, wherein natural candidates are comprehensible; unnatural candidates are incomprehensible.

11. A computer program product for suggesting query rewrite rules, the computer program product comprising a computer readable non-transitory storage medium having program code embodied therewith, the program code readable/executable by a processor to:
 provide a missing search result for a query;
 generate a collection of semantically coherent rewrite rules based on the missing search result, said generating comprising:
  selecting a plurality of candidates comprising subsequences of the query and subsequences of particular fields of a document;
  invoking a search engine using the plurality of candidates for providing a plurality of search results;
  filtering out particular candidates that fail to achieve a desired search result; and
  classifying remaining candidates into natural candidates and unnatural candidates based on a learned classifier; and
 suggesting query rewrite rules for document searching based on the classified remaining candidates.

12. The computer program product of claim 11, wherein the learned classifier uses features from corpus statistics, query-log statistics and linguistic resources.

13. The computer program product of claim 12, further comprising:
 for benchmark data comprising a set of queries and desired results for the queries and a set of rewrite rules, selecting a subset of the collection of semantically coherent rewrite rules based on a plurality of constraints and a utility function.

14. The computer program product of claim 13, wherein selecting the subset of the collection of semantically coherent rewrite rules comprises:
 generating a graph for capturing an interplay between search queries rewrite rules, query reformulations and documents;
 selecting a sub-graph based on a scoring function; and
 selecting the subset of the collection of semantically coherent rewrite rules based on a heuristic process applied to the selected sub-graph.

15. The computer program product of claim 14, wherein the heuristic process provides for one of a global rule exhaustion process and a local rule exhaustion process.

16. The computer program product of claim 15, wherein the heuristic process further comprises using weighted queries based on frequencies derived from query logs.

17. The computer program product of claim 16, wherein the particular fields comprise any fields containing informative description related to the document.

18. The computer program product of claim 17, further comprising using the selected subset of the collection of semantically coherent rewrite rules for automatically suggesting query rewrite rules for enterprise system document searching.

19. The computer program product of claim 18, wherein queries are conducted on an intranet of the enterprise system.

20. The computer program product of claim 11, wherein natural candidates are comprehensible; unnatural candidates are incomprehensible.

\* \* \* \* \*